(12) United States Patent
Murata et al.

(10) Patent No.: US 7,542,117 B2
(45) Date of Patent: Jun. 2, 2009

(54) LIQUID CRYSTAL DISPLAY DEVICE HAVING A SELECTIVE REFLECTION LAYER, MOBILE ELECTRONIC DEVICE INCORPORATING THE SAME, AND SUBSTRATE FOR LIQUID CRYSTAL DISPLAY DEVICE HAVING A SELECTIVE REFLECTION LAYER

(75) Inventors: Mitsuhiro Murata, Yao (JP); Yukio Matsuura, Tenri (JP); Takeshi Masuda, Shijonawate (JP); Yukihiro Sumida, Yamatokoriyama (JP)

(73) Assignee: Sharp Kabushiki Kaisha, Osaka (JP)

( * ) Notice: Subject to any disclaimer, the term of this patent is extended or adjusted under 35 U.S.C. 154(b) by 420 days.

(21) Appl. No.: 11/227,035

(22) Filed: Sep. 15, 2005

(65) Prior Publication Data
US 2006/0055850 A1 Mar. 16, 2006

(30) Foreign Application Priority Data
Sep. 16, 2004 (JP) .............................. 2004-269825
Sep. 24, 2004 (JP) .............................. 2004-277148

(51) Int. Cl.
*G02F 1/1335* (2006.01)
(52) U.S. Cl. .................... 349/115; 359/361; 349/65; 362/624; 362/625
(58) Field of Classification Search ................... 349/115
See application file for complete search history.

(56) References Cited

U.S. PATENT DOCUMENTS

| | | | |
|---|---|---|---|
| 5,764,322 A * | 6/1998 | Mamiya et al. ................ 349/65 |
| 6,147,725 A | 11/2000 | Yuuki et al. | |
| 6,642,976 B2 * | 11/2003 | Umemoto et al. ............. 349/65 |
| 6,796,669 B2 | 9/2004 | Masuda | |
| 2002/0039155 A1 | 4/2002 | Umemoto | |
| 2002/0172031 A1 * | 11/2002 | Masuda ........................ 362/31 |
| 2003/0218701 A1 | 11/2003 | Kawakami | |

FOREIGN PATENT DOCUMENTS

| | | |
|---|---|---|
| JP | 08-094844 | 4/1996 |
| JP | 2000-131681 | 5/2000 |
| JP | 2000-180850 A | 6/2000 |
| JP | 2001-075087 | 3/2001 |

(Continued)

OTHER PUBLICATIONS

"Kogaku Hakumaku (Optical Thin Film)," Published by Kyoritsu Shuppan Co., Ltd.; Feb. 1985; pp. 126-129.

(Continued)

*Primary Examiner*—Andrew Schechter
*Assistant Examiner*—Lauren Nguyen
(74) *Attorney, Agent, or Firm*—Keating & Bennett, LLP

(57) ABSTRACT

A liquid crystal display device according to the present invention includes: a first substrate; a second substrate disposed so as to be closer to a viewer than the first substrate is; a liquid crystal layer provided between the first substrate and the second substrate; a light source provided by a side of the first substrate, the light source emitting light toward a side face of the first substrate; and a selective reflection layer formed on a principal face of the first substrate opposite from the viewer, the selective reflection layer selectively reflecting light of a specific polarization direction.

5 Claims, 15 Drawing Sheets

FOREIGN PATENT DOCUMENTS

| | | |
|---|---|---|
| JP | 2003-075832 | 3/2003 |
| JP | 2003-215585 | 7/2003 |
| JP | 2004-246100 A | 9/2004 |
| WO | WO 2004/042273 | 5/2004 |

OTHER PUBLICATIONS

"Oyobutsurikogaku Sensho 3 Hakumaku (Applied Physical Engineering, Selected Book 3, Thin Film)," Published by Baifukan Kabushiki Kaisha; Jun. 30, 1990; p. 203.

* cited by examiner

FIG.6A
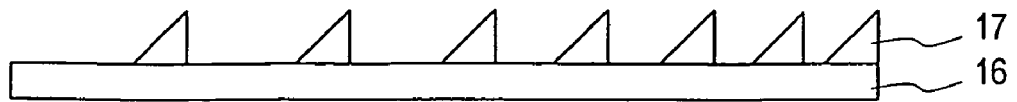
FIG.6B
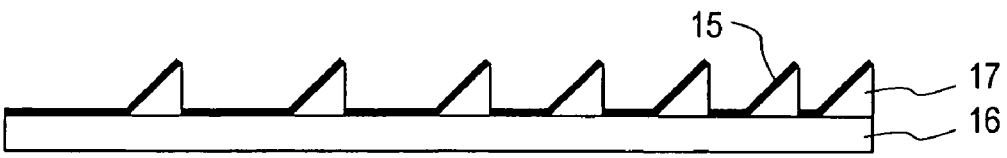
FIG.6C
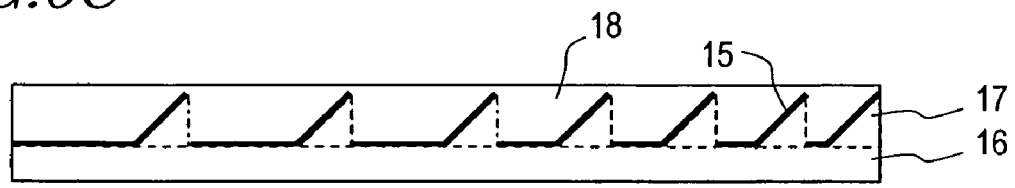
FIG.6D
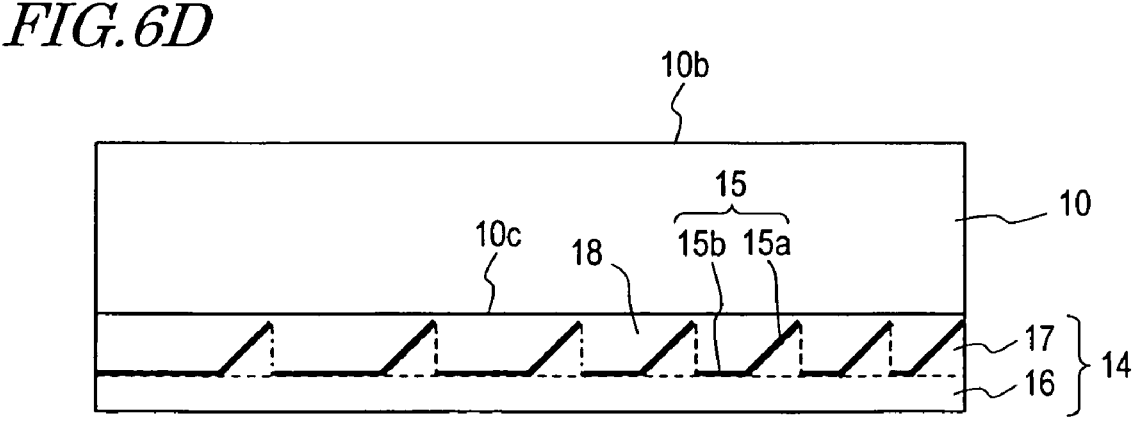

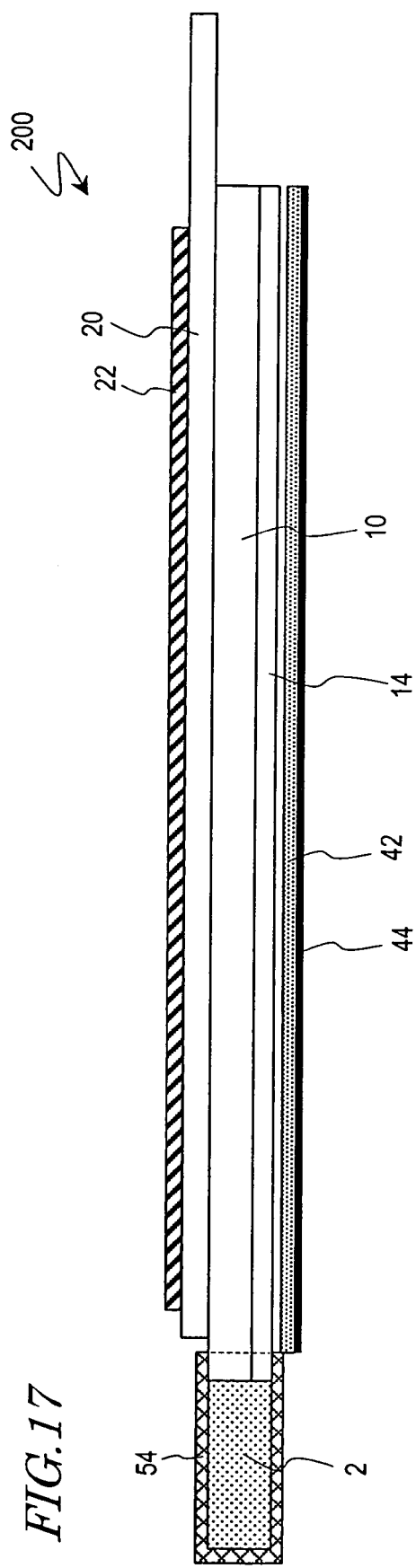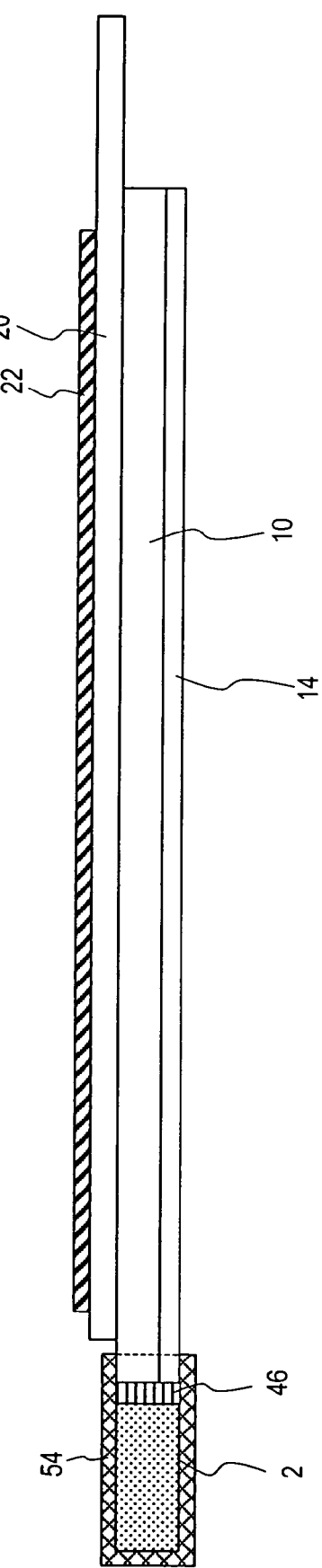

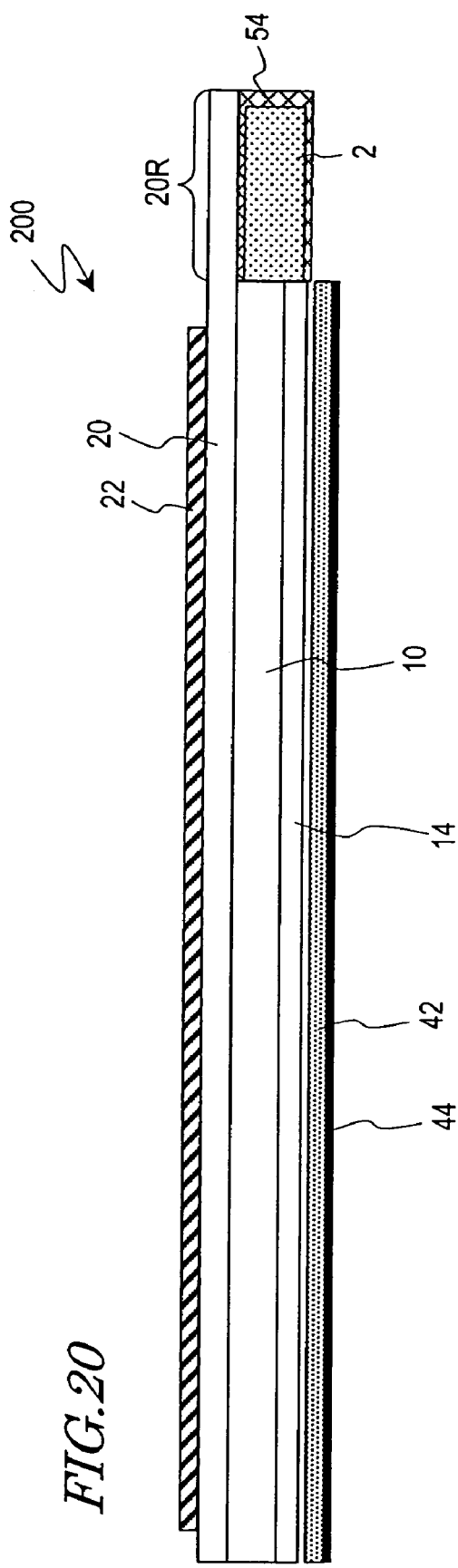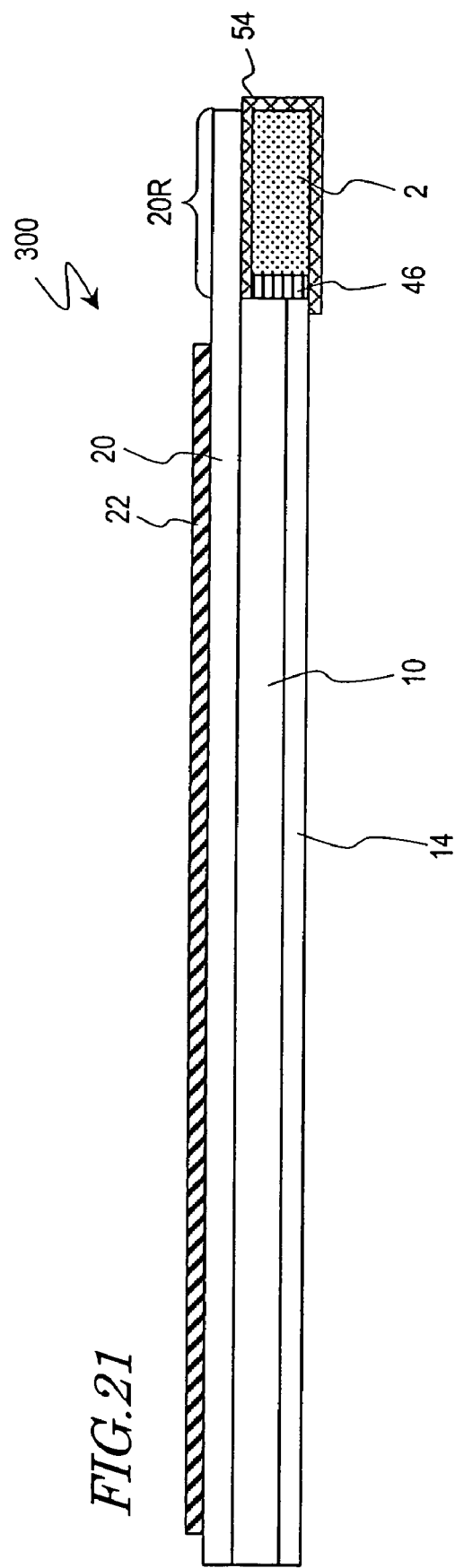

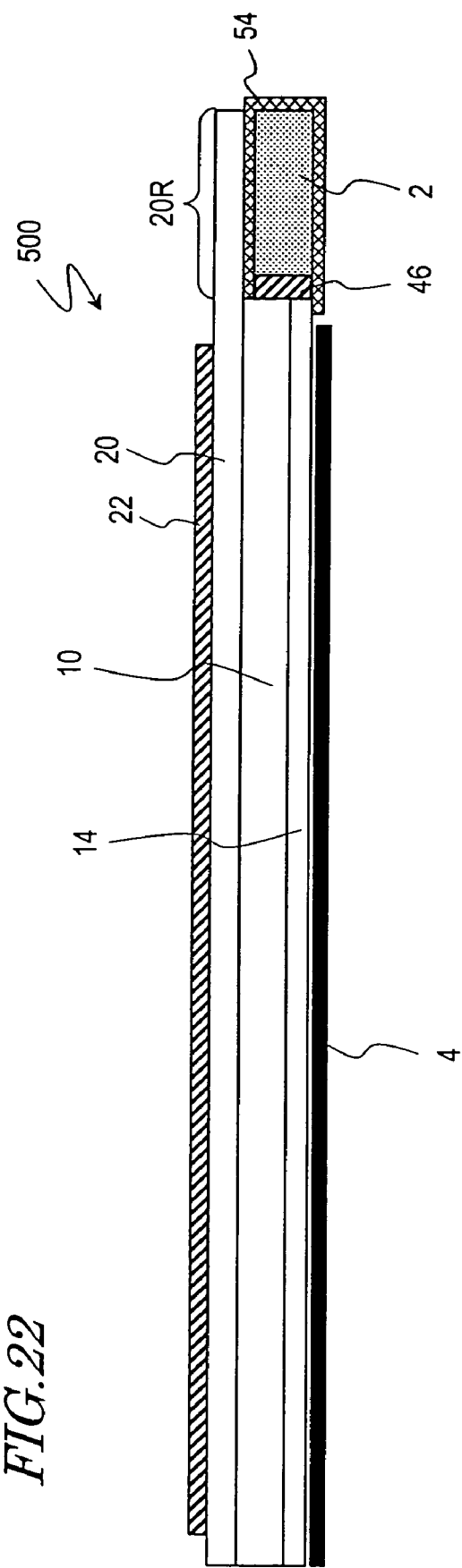

LIQUID CRYSTAL DISPLAY DEVICE HAVING A SELECTIVE REFLECTION LAYER, MOBILE ELECTRONIC DEVICE INCORPORATING THE SAME, AND SUBSTRATE FOR LIQUID CRYSTAL DISPLAY DEVICE HAVING A SELECTIVE REFLECTION LAYER

BACKGROUND OF THE INVENTION

1. Field of the Invention

The present invention relates to a liquid crystal display device, and in particular to a liquid crystal display device which is suitably used for a mobile electronic device. The present invention also relates to a mobile electronic device incorporating such a liquid crystal display device, and a substrate for use in such a liquid crystal display device.

2. Description of the Related Art

In recent years, mobile electronic devices such as mobile phones and PDAs (Personal Digital Assistants) are in wide use. In a display section of a mobile electronic device, a liquid crystal display device is frequently used because of its advantages in terms of thinness, light weight, and low power consumption.

A liquid crystal display device is a non-emission type display device, and therefore includes an illuminator (called a backlight) so that light from the backlight is utilized in performing display. A backlight is generally composed of a light source, a reflection plate, a light guiding plate, a lens sheet, and the like. Since the thickness of a backlight greatly affects the overall thickness of the liquid crystal display device, a thin backlight must be used in order to realize a thin liquid crystal display device.

Backlights are generally classified into "direct type" backlights (such as that which is disclosed in Japanese Laid-Open Patent Publication No. 2003-215585) and "edge light type" backlights (such as that which is disclosed in Japanese Laid-Open Patent Publication No. 8-94844). A "direct type" backlight includes, as shown in FIG. 23, a plurality of light sources 702 (such as cold-cathode tubes) which are disposed immediately under a liquid crystal display panel 701. On the other hand, an "edge light type" backlight includes, as shown in FIG. 24, a light source 802 disposed on a side edge of a light guiding plate 803, which in itself is provided immediately under a liquid crystal display panel 801, such that the light from the light source 802 is led to the liquid crystal display panel 801 by the light guiding plate 803.

Since an edge light type backlight can be made thin more easily than a direct type backlight, edge light type backlights are currently used in many small-sized liquid crystal display devices.

However, liquid crystal display devices are required to become even thinner due to the recent explosive prevalence of mobile electronic devices. Such needs cannot be satisfied by conventional edge light type backlights.

SUMMARY OF THE INVENTION

In order to overcome the problems described above, preferred embodiments of the present invention provide: a liquid crystal display device which can be made thinner than conventionally; a mobile electronic device incorporating the same; and a substrate for such a liquid crystal display device.

A liquid crystal display device according to the present invention comprises: a first substrate; a second substrate disposed so as to be closer to a viewer than the first substrate is; a liquid crystal layer provided between the first substrate and the second substrate; a light source provided by a side of the first substrate, the light source emitting light toward a side face of the first substrate; and a selective reflection layer formed on a principal face of the first substrate opposite from the viewer, the selective reflection layer selectively reflecting light of a specific polarization direction. Thus, the aforementioned objective is met.

In a preferred embodiment, the liquid crystal display device according to the present invention further comprises a low-refractive index layer formed on a principal face of the first substrate closer to the viewer, the low-refractive index layer having a refractive index lower than a refractive index of the first substrate.

In a preferred embodiment, the liquid crystal display device according to the present invention further comprises a polarizing plate provided between the light source and the side face of the first substrate, the polarizing plate having a transmission axis which is substantially parallel to the specific polarization direction.

In a preferred embodiment, the liquid crystal display device according to the present invention further comprises: a reflection plate provided on an opposite side from the viewer with respect to the selective reflection layer; and a polarizing plate provided between the selective reflection layer and the reflection plate, the polarizing plate having a transmission axis which is substantially parallel to the specific polarization direction.

In a preferred embodiment, the selective reflection layer internally includes a reflection film for selectively reflecting light of the specific polarization direction.

In a preferred embodiment, at least part of the reflection film is tilted with respect to the principal face of the first substrate closer to the viewer.

In a preferred embodiment, the reflection film is a transparent dielectric film or a dielectric multilayer film.

In a preferred embodiment, the liquid crystal display device according to the present invention further comprises: a light absorbing plate provided on an opposite side from the viewer with respect to the selective reflection layer, the light absorbing plate absorbing light leaking from the selective reflection layer, wherein the light absorbing plate is formed in such a manner that an optical absorbance of the light absorbing plate increases in a direction from an end of the light absorbing plate closer to the light source toward an end of the light absorbing plate opposite from the light source.

In a preferred embodiment, the light absorbing plate is formed in such a manner that the optical absorbance of the light absorbing plate gradually increases in the direction.

In a preferred embodiment, the light absorbing plate is formed in such a manner that the optical absorbance of the light absorbing plate increases in a stepwise manner in the direction.

In a preferred embodiment, the light absorbing plate is formed with an increasing thickness, the thickness increasing in the direction.

In a preferred embodiment, the light absorbing plate has, on a side closer to the selective reflection layer, a surface having a light diffusing ability which becomes lower in the direction.

In a preferred embodiment, the second substrate has a non-overlapping region which does not overlap with the first substrate when seen from a normal direction of the liquid crystal layer, and the light source is disposed so as to overlap the non-overlapping region of the second substrate.

A mobile electronic device according to the present invention comprises a liquid crystal display device having the aforementioned constitution. Thus, the aforementioned objective is met.

A substrate for a liquid crystal display device according to the present invention comprises: a base substrate; a low-refractive index layer formed on one of two principal faces of the base substrate, the low-refractive index layer having a refractive index lower than a refractive index of the base substrate; and a selective reflection layer provided on the other of the two principal faces of the base substrate, the selective reflection layer selectively reflecting light of a specific polarization direction. Thus, the aforementioned objective is met.

In a preferred embodiment, the selective reflection layer internally includes a reflection film for selectively reflecting light of the specific polarization direction.

In a preferred embodiment, at least part of the reflection film is tilted with respect to the one principal face of the base substrate.

In a preferred embodiment, the reflection film is a transparent dielectric film or a dielectric multilayer film.

According to the present invention, there are provided: a liquid crystal display device which can be made thinner than conventionally; a mobile electronic device incorporating the same; and a substrate for such a liquid crystal display device.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 6A, 6B, 6C, and 6D are cross-sectional views schematically showing steps of forming a selective reflection layer.

FIG. 17 is a cross-sectional view schematically showing the liquid crystal display device 200.

FIG. 18 is a cross-sectional view schematically showing the liquid crystal display device 300.

FIG. 20 is a cross-sectional view schematically showing the liquid crystal display device 200.

FIG. 21 is a cross-sectional view schematically showing the liquid crystal display device 300.

FIG. 22 is a cross-sectional view schematically showing the liquid crystal display device 500.

DETAILED DESCRIPTION OF PREFERRED EMBODIMENTS

Hereinafter, preferred embodiments of the present invention will be described with reference to the accompanying drawings. However, the present invention is not to be limited to the following embodiments.

Figure 1:
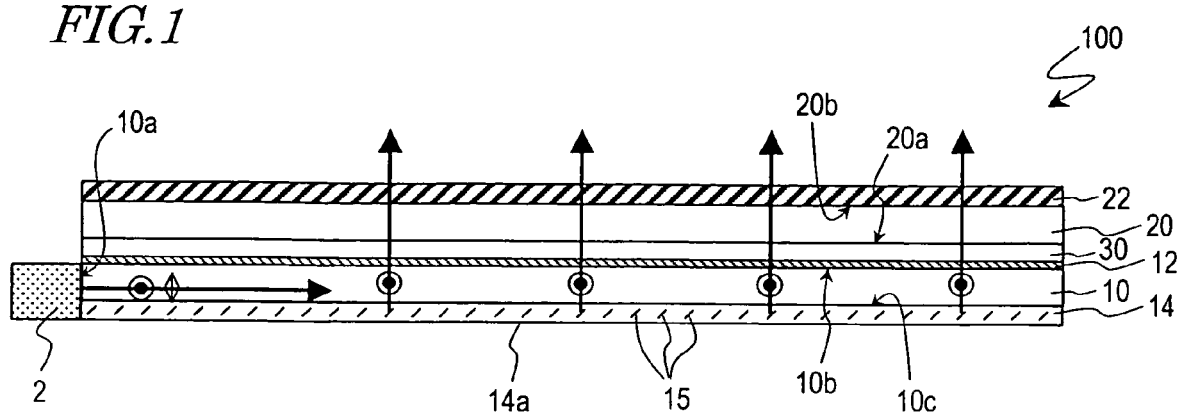
FIG. 1 is a cross-sectional view schematically showing a liquid crystal display device 100 according to a preferable embodiment of the present invention.

FIG. 1 shows a liquid crystal display device 100 according to the present embodiment. The liquid crystal display device 100 is a transmission-type liquid crystal display device comprising: a first substrate (e.g., a glass substrate or a plastic substrate) 10; a second substrate (e.g., a glass substrate or a plastic substrate) 20 disposed on the side of the first substrate 10 closer to the viewer; and a liquid crystal layer 30 interposed therebetween. Hereinafter, the first substrate 10, which is disposed on the rear face side of the liquid crystal layer 30, will be referred to as the "rear substrate", whereas the second substrate 20, which is disposed on the front face side (viewer side) of the liquid crystal layer 30, will be referred to as the "front substrate".

On a side edge of the rear substrate 10, a linear source of light 2 is provided. The linear source of light 2 emits light toward a side face (light-entering surface) 10a of the rear substrate 10. For example, the linear source of light 2 may be a cold-cathode tube, or a combination of a point source of light (e.g., a light emitting diode (LED)) and a linear light guiding member.

On a viewer-side principal face 10b of the rear substrate 10 (i.e., one of the principal faces of the rear substrate 10 that is closer to the liquid crystal layer 30), a low-refractive index layer 12, which has a refractive index lower than the refractive index of the rear substrate 10, is formed. On the low-refractive index layer 12, electrodes for applying a voltage across the liquid crystal layer 30, and an alignment film (neither of which is shown) are further formed.

On the other principal face 10c of the rear substrate 10 (i.e., the principal face opposite from the viewer-side principal face 10b), a selective reflection layer 14 for selectively reflecting light of a specific polarization direction is formed.

As shown in FIG. 1, the selective reflection layer 14 in the present embodiment selectively reflects light whose polarization direction is substantially parallel to the principal faces 10b and 10c of the rear substrate 10 (i.e., light which vibrates in a direction perpendicular to the plane of FIG. 1).

The selective reflection layer 14 internally includes reflection films 15 which selectively reflect light of a specific polarization direction. The reflection films 15 are tilted with respect to the viewer-side principal face 10b of the rear substrate 10. Each reflection film 15 is tilted so that one of its ends that is farther from the light source 2 lies closer to the rear substrate 10 than is the other end (i.e., the end closer to the light source 2). The reflection films 15 may be, for example, transparent dielectric films or dielectric multilayer films.

On the principal face of the front substrate 20 that is closer to the liquid crystal layer 30, electrodes for applying a voltage across the liquid crystal layer 30, and an alignment film (neither of which is shown) are formed. A polarizing plate 22 is provided on the viewer-side principal face 20b of the front substrate 20.

The light which exits the light source 2 and enters the rear substrate 10 at the light-entering surface 10a propagates inside the rear substrate 10 and the selective reflection layer 14 while repeating total reflection between the viewer-side principal face 10b of the rear substrate 10 and a face 14a of the selective reflection layer 14 that is opposite from the viewer side. The low-refractive index layer 12 is provided in order to cause the light which propagates through the rear substrate 10 and the selective reflection layer 14 to undergo efficient total reflection at the viewer-side principal face 10b of the rear substrate 10. A portion of the light propagating through the rear substrate 10 and the selective reflection layer 14 is reflected by the reflection films 15 within the selective reflection layer 14, so as to travel toward the viewer side (i.e., toward the liquid crystal layer 30) and go out from the viewer-side principal face 10b of the rear substrate 10. Hereinafter, the viewer-side principal face 10b of the rear substrate 10 may also be referred to as a "light-outgoing surface".

As described above, in the liquid crystal display device 100 of the present embodiment, the selective reflection layer 14 is formed on the principal face 10c of the rear substrate 10 that is opposite from the viewer side, and light is allowed to enter into the rear substrate 10 from the light source 2 located on a side edge of the rear substrate 10, so that the rear substrate 10 functions in a manner similar to a light guiding plate. Thus, as compared to the case where a conventional edge light type backlight is employed, the liquid crystal display device 100 can be made thinner due to the omission of a light guiding plate. Since the selective reflection layer 14 selectively reflects light of a specific polarization direction, it is unnecessary to provide a separate polarizing plate on the rear face side of the liquid crystal layer 30, which makes further thinning possible.

Hereinafter, preferable constitutions for the low-refractive index layer 12 and the selective reflection layer 14 will be described.

First, a preferable constitution for the low-refractive index layer 12 will be described. In order to cause efficient light propagation within the rear substrate 10, the difference between the refractive index of the low-refractive index layer 12 and the refractive index of the rear substrate 10 should preferably be about 0.1 or more, and more preferably about 0.18 or more. As the material of the low-refractive index layer 12, for example, $MgF_2$ (refractive index: about 1.38), perfluoro resin (refractive index: about 1.34), or silicon oxide (refractive index: about 1.3) can be used.

Next, a preferable constitution for the selective reflection layer 14 will be described.

Firstly, for empirical reasons, a tilt angle $\alpha$ (i.e., a tilt angle with respect to the light-outgoing surface 10b) of each reflection film 15 of the selective reflection layer 14 is preferably no less than about 50° and no more than about 60°, and more preferably about 51°.

Next, the preferable thickness of the reflection films 15, in the case where the reflection films 15 are transparent dielectric films or dielectric multilayer films, will be described.

As for polarization beam splitters which utilize polarization dependence of reflectance of a dielectric multilayer film and light interference, it is known that, by alternately stacking dielectric films having different refractive indices so as to have a thickness which satisfies the $\lambda/4$ condition with respect to a specific wavelength $\lambda$ of light, it is possible to prescribe a high reflectance for S-polarized light while maintaining a low reflectance for P-polarized light (see, for example, KYORITSU SHUPPAN CO., LTD., "optical thin film", pp. 126 to 129). As for dielectric film materials, various materials such as $MgF_2$, $SiO_2$, and $Al_2O_3$ are known (see, for example, BAIFUKAN CO., LTD, "Ohyoh Butsurikohgaku Sensho 3, thin film" p. 203).

Figure 2:
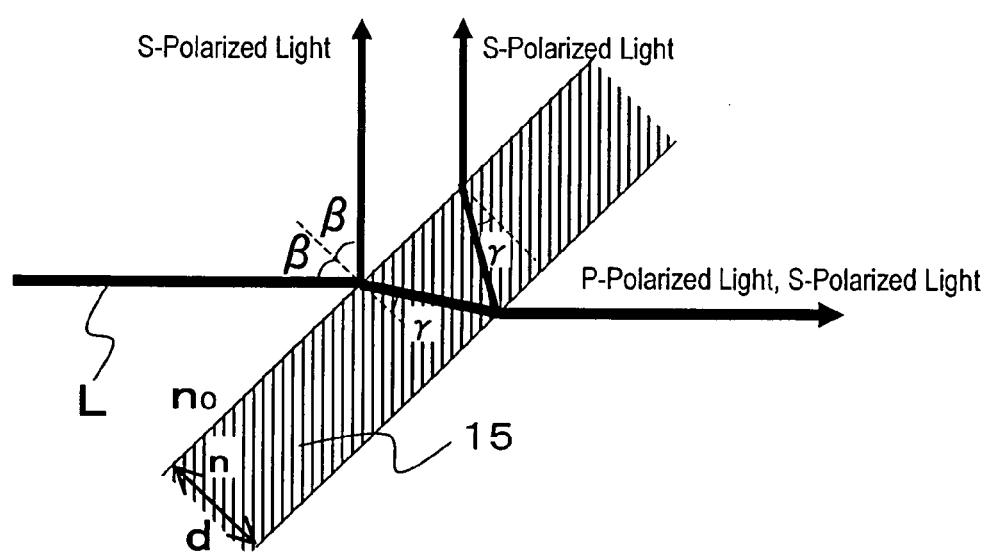
FIG. 2 is a diagram for explaining a preferable thickness of a reflection film.

As for each reflection film 15 of the selective reflection layer 14, too, it is possible to prescribe a high reflectance for S-polarized light while maintaining a low reflectance for P-polarized light, by forming a dielectric film or a dielectric multilayer film so as to have a thickness which satisfies the $\lambda/4$ condition. Specifically, as shown in FIG. 2, given an incident angle $\beta$ of a principal ray L of the light exiting the light source 2 and entering into the rear substrate 10 as taken with respect to the dielectric film (or dielectric multilayer film) 15, it is preferable that a refraction angle $\gamma$ of this principal ray with respect to the dielectric film 15, a thickness d of the dielectric film 15, a refractive index n of the dielectric film 15, and a refractive index n0 of the portions of the selective reflection layer 14 excluding the dielectric films 15 satisfy eq. 1 and eq. 2 below.

$$d=\lambda/(4n\cdot\cos\beta) \qquad \text{eq. 1}$$

$$n0\cdot\sin\beta=n\cdot\sin\gamma \qquad \text{eq. 2}$$

Given the fact that visible light has a wavelength from about 380 nm to about 780 nm, it is preferable that the thickness d of the dielectric film (or dielectric multilayer film) 15 satisfies eq. 1' below.

$$380/(4n\cdot\cos\beta)\leq d\leq 780/(4n\cdot\cos\beta) \qquad \text{eq. 1'}$$

The configuration (as seen from the normal direction of the liquid crystal layer 30) of the reflection films 15 may be arbitrary. For example, the reflection films 15 may be formed in linear (stripe) shapes as shown in FIG. 3A, or in islet (dot) shapes as shown in FIG. 3B.

Figure 3A:
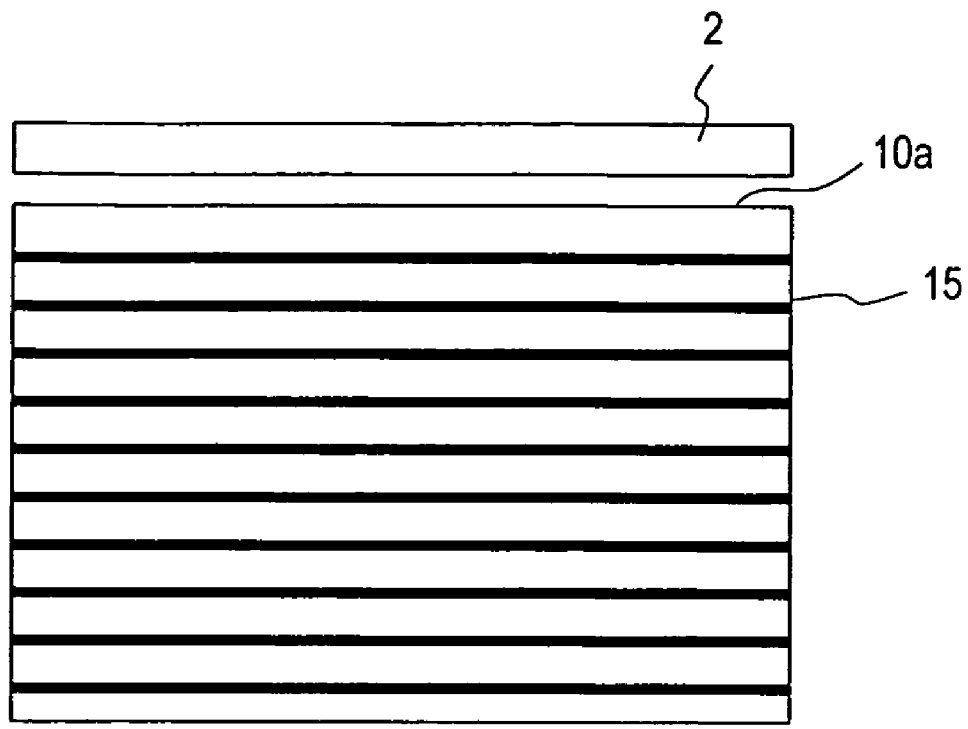
FIGS. 3A and 3B are upper plan views each showing an exemplary shapes of reflection films.
Figure 3B:
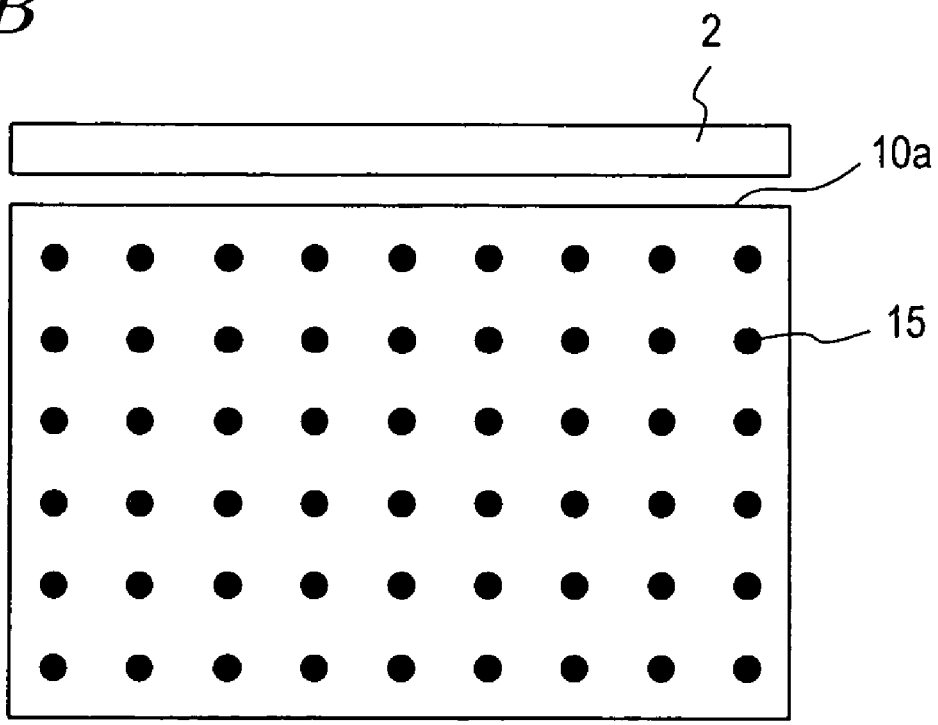
Figure 4A:
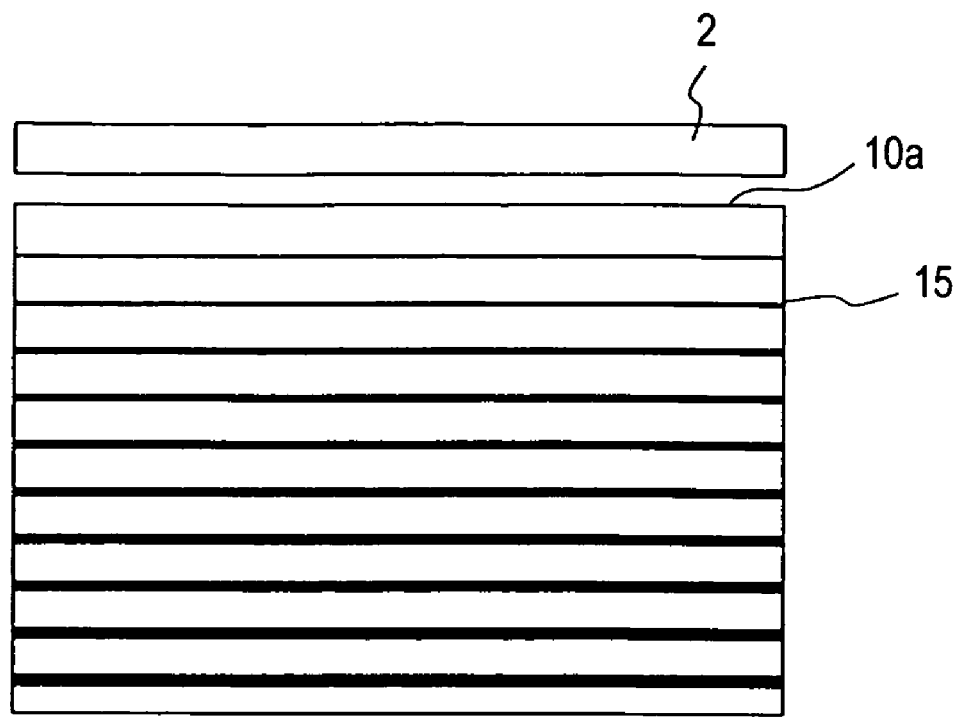
FIGS. 4A and 4B are upper plan views each showing other exemplary shapes of reflection films.
Figure 4B:
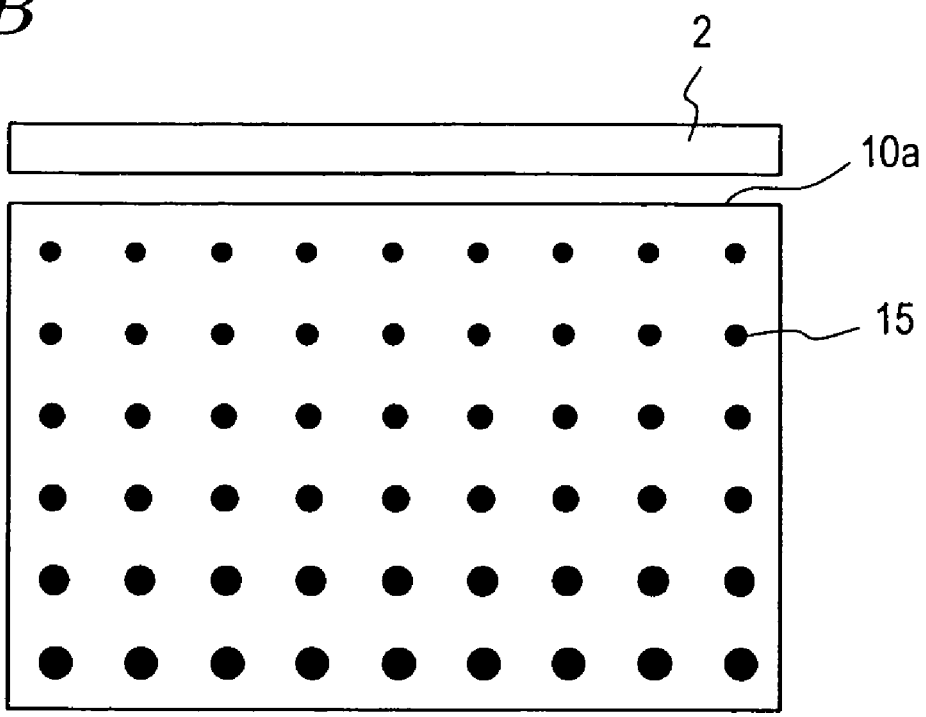

With respect to the area of the light-outgoing surface 10b of the rear substrate 10, the area of the reflection films 15 as projected onto the light-outgoing surface 10b may account for a constant proportion across the entire plane of the light-outgoing surface 10b (as shown in FIGS. 3A and 3B), or account for an increasing proportion as going away from the light source 2 (as shown in FIGS. 4A and 4B). In the case where the reflection films 15 account for an increasing proportion as going away from the light source 2, the intensity distribution of the light going out from the light-outgoing surface 10b can be made uniform. Alternatively, as shown in FIGS. 4A and 4B, the reflection films 15 may be formed so as to increase in area as going away from the light source 2 but maintain a constant repetition pitch, or to have substantially the same area but decreasing repetition pitches as going away from the light source 2.

Other than MgF$_2$, SiO$_2$, and Al$_2$O$_3$ as mentioned above, TiO$_2$ or ZrO$_2$ may also be used as the material of the reflection films 15. Hereinafter, with reference to FIGS. 5A to 5D, an exemplary method for forming the selective reflection layer 14 will be described.

Figure 5A:
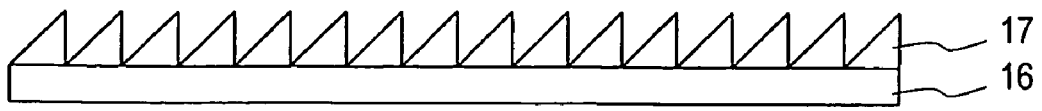
FIGS. 5A, 5B, 5C, and 5D are cross-sectional views schematically showing steps of forming a selective reflection layer.

First, as shown in FIG. 5A, on a plate-like film 16 formed of a resin (e.g., ZEONOR® from ZEON CORPORATION, which has a refractive index of 1.53), a plurality of protrusions 17 each having a right-triangular cross section are formed by using a resin (e.g., a UV-curable resin having a refractive index of 1.53).

Figure 5B:
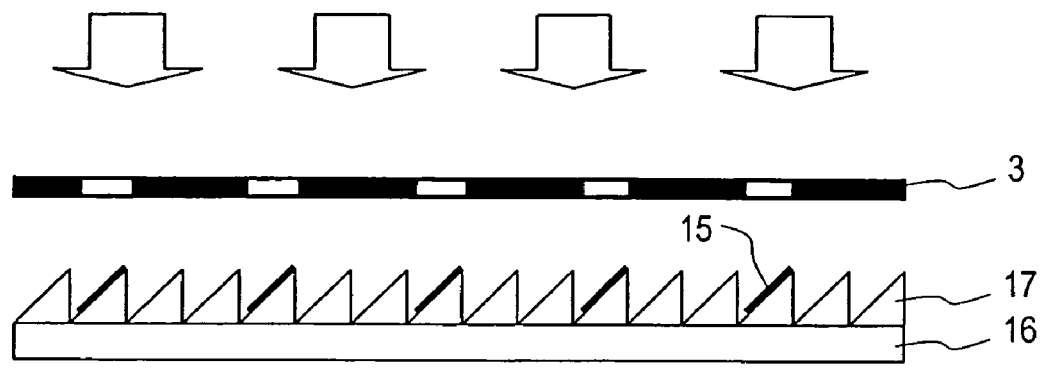

Next, as shown in FIG. 5B, on the slanted surface of each protrusion 17 (i.e., the surface which is tilted with respect to the principal faces of the plate-like film 16), a dielectric material (e.g., TiO$_2$ having a refractive index of 2.2 or ZrO$_2$ having a refractive index of 2.0) is vapor-deposited via a mask 3, whereby the reflection films 15 are formed.

Figure 5C:
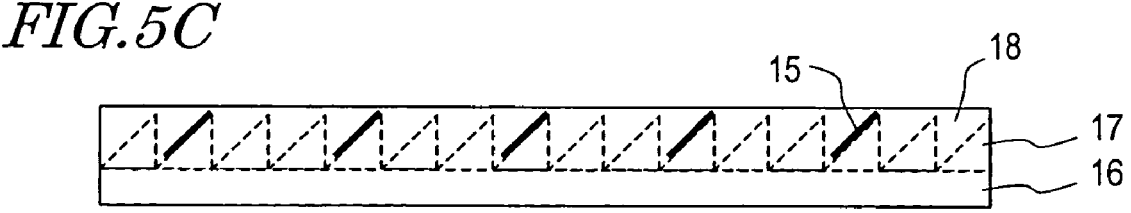

Then, as shown in FIG. 5C, a material having adhesiveness (e.g., a UV-curable resin or adhesive material having a refractive index of 1.53) is applied so as to cover the protrusions 17, thus forming an adhesion layer 18.

Figure 5D:
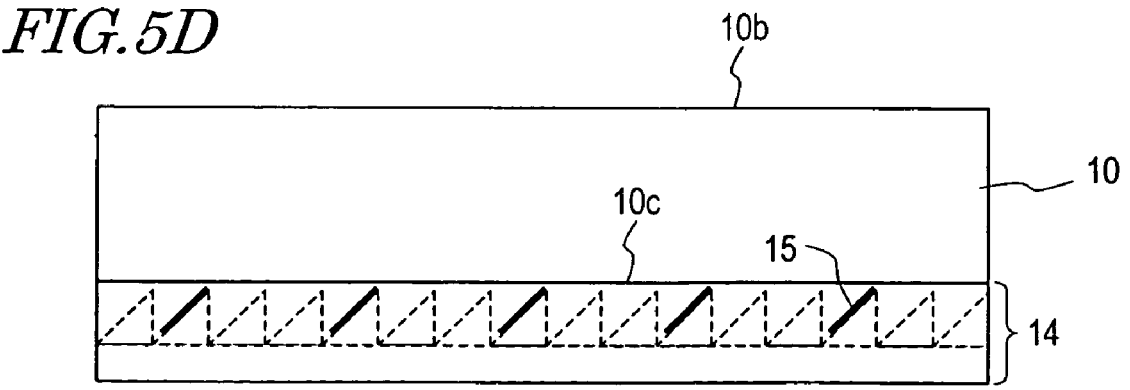

Thereafter, as shown in FIG. 5D, the adhesion layer 18 is allowed to come in contact with the principal face 10c of the rear substrate (e.g., a glass substrate having a refractive index of 1.52) 10, and the adhesion layer 18 is allowed to cure, whereby the selective reflection layer 14 is formed on the principal face 10c of the rear substrate 10.

Next, with reference to FIGS. 6A to 6D, another exemplary method of forming the selective reflection layer 14 will be described.

First, as shown in FIG. 6A, by using a resin, a plurality of protrusions 17 each having a right-triangular cross section are formed on the plate-like film 16, which in itself is also formed from a resin. Note that the protrusions 17 are disposed with predetermined intervals therebetween, as opposed to the step shown in FIG. 5A, where the protrusions 17 are disposed on the film 16 with no interspaces therebetween. The protrusions 17 are formed in such a manner that the interval between adjoining protrusions 17 becomes smaller as going away from a light source 2 which will later be disposed.

Next, as shown in FIG. 6B, a dielectric material is vapor-deposited on the film 16 having the protrusions 17 formed thereon, thus forming the reflection films 15. At this time, the reflection films 15 are formed on the slanted surfaces of the protrusions 17 as well as on the portions of the film 16 where no protrusions 17 are formed.

Then, as shown in FIG. 6C, a material having adhesiveness is applied so as to cover the reflection films 15, thus forming an adhesion layer 18.

Thereafter, as shown in FIG. 6D, the adhesion layer 18 is allowed to come in contact with the principal face 10c of the rear substrate 10, and the adhesion layer 18 is allowed to cure, whereby the selective reflection layer 14 is formed on the principal face 10c of the rear substrate 10.

Each of the reflection films 15 of the selective reflection layer 14 having been formed as described in FIGS. 6A to 6D includes: a tilted region 15a which is tilted with respect to the light-outgoing surface 10b of the rear substrate 10; and a parallel region 15b which lies parallel to the light-outgoing surface 10b. Among the two regions, it is the tilted region 15a that causes the light propagating inside the rear substrate 10 to be reflected toward the light-outgoing surface 10b at an angle which does not satisfy the total reflection condition, and therefore contributes to the takeout of light from the light-outgoing surface 10b. In other words, only the tilted regions 15a substantially function as reflection films.

The formation steps shown in FIGS. 5A to 5D require a mask 3 to control the positioning of the reflection films 15. On the other hand, with the formation steps shown in FIGS. 6A to 6D, it is possible to control the positioning of the tilted regions 15a (which substantially function as reflection films) by merely adjusting the positioning of the protrusions 17, and thus the formation steps are simplified.

Note that the selective reflection layer 14 which has been formed as described above may have a low degree of polarization as compared to a usual polarizing plate which is formed by allowing a dichroic dye (such as iodine or a dye-stuff) to adsorb to a PVA film and then drawing the PVA film. Therefore, from the standpoint of obtaining a high contrast ratio, it may be effective to provide a further polarizing plate in addition to the polarizing plate 22 which is provided on the front substrate 20.

Figure 7:
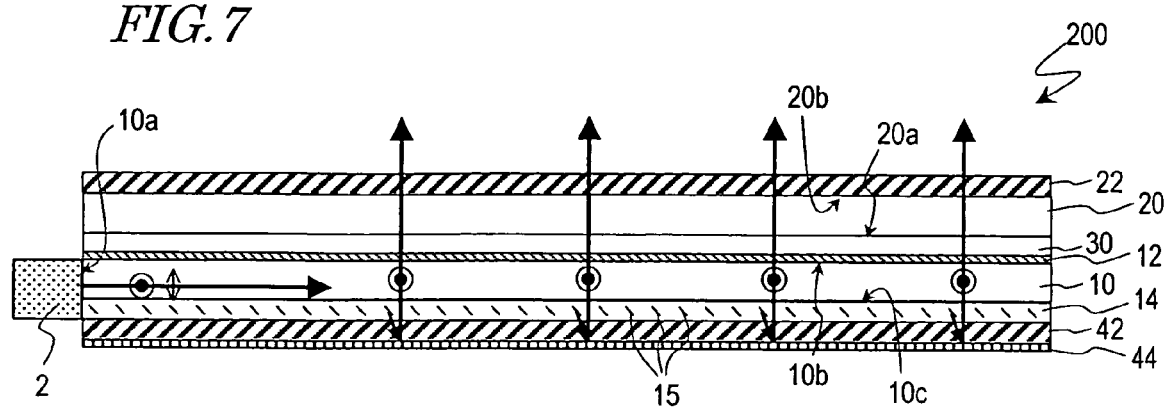
FIG. 7 is a cross-sectional view schematically showing a liquid crystal display device 200 according to a preferable embodiment of the present invention.

FIG. 7 shows a liquid crystal display device 200 which comprises a further polarizing plate. The liquid crystal display device 200 differs from the liquid crystal display device 100 shown in FIG. 1 in that a polarizing plate 42 and a reflection plate 44 are provided on the rear face side of the selective reflection layer 14.

As shown in FIG. 7, the liquid crystal display device 200 includes a reflection plate 44 which is provided on the opposite side of the selective reflection layer 14 from the viewer, and a polarizing plate 42 which is provided between the selective reflection layer 14 and the reflection plate 44. The reflection plate 44 is formed from an Ag alloy or Al, for example. The polarizing plate 42 is disposed in such a manner that the transmission axis thereof is substantially parallel to the polarization direction of light which has been reflected by the selective reflection layer 14.

In the liquid crystal display device 100 shown in FIG. 1, the reflection films 15 in the selective reflection layer 14 are tilted so as to cause the light propagating through the rear substrate 10 to be reflected toward the liquid crystal layer 30. On the other hand, in the liquid crystal display device 200, as shown in FIG. 7, the reflection films 15 in the selective reflection layer 14 are tilted so as to cause the light propagating through the rear substrate 10 to be reflected in the opposite direction from the liquid crystal layer 30, i.e., toward the polarizing plate 42.

In the liquid crystal display device 200 having the aforementioned constitution, a portion of the light propagating inside the rear substrate 10 and the selective reflection layer 14 is reflected by the reflection films 15 in the selective reflection layer 14 once in the opposite direction from the liquid crystal layer 30, i.e., toward the polarizing plate 42, and after being reflected from the reflection plate 44, travels back through the polarizing plate 42 so as to go out from the light-outgoing surface 10b.

In the liquid crystal display device 200, the light which has been reflected by the selective reflection layer 14 travels through the polarizing plate 42 before entering the liquid crystal layer 30, thus making it possible to obtain a high contrast ratio even in the case where the selective reflection layer 14 has a low degree of polarization.

However, in accordance with the constitution of the liquid crystal display device 200, light which has been reflected by the selective reflection layer 14 will travel through the polarizing plate 42 twice before entering the liquid crystal layer 30. As a result, the luminance may decrease.

Figure 8:
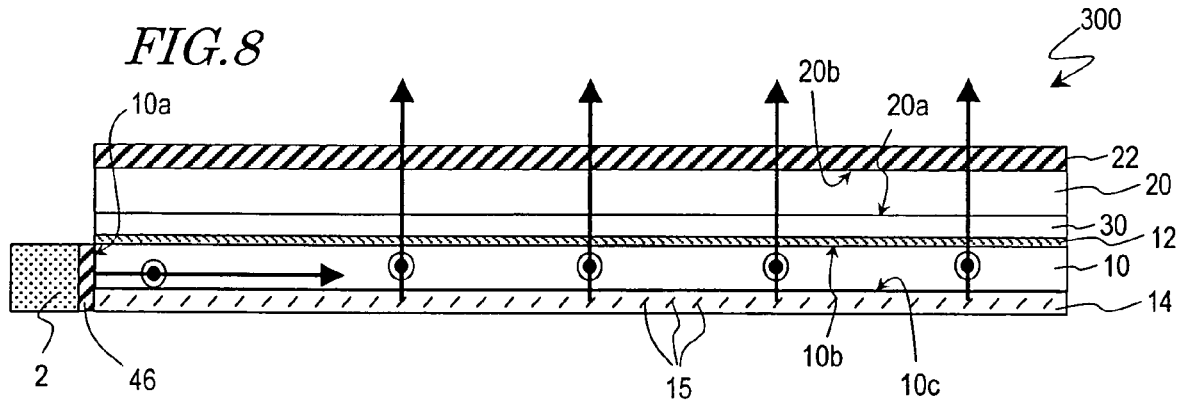
FIG. 8 is a cross-sectional view schematically showing a liquid crystal display device 300 according to a preferable embodiment of the present invention.

By adopting a constitution of a liquid crystal display device 300 as shown in FIG. 8, it becomes possible to suppress the decrease in luminance while obtaining a high contrast ratio.

The liquid crystal display device 300 differs from the liquid crystal display device 100 shown in FIG. 1 in that a polarizing plate 46 is provided between the light source 2 and a side face of the rear substrate 10. The polarizing plate 46 has a transmission axis which is substantially parallel to the polarization direction of light which has been reflected by the selective reflection layer 14.

In the liquid crystal display device 300, light exiting the light source 2 is led through the polarizing plate 46 before entering the rear substrate 10, and therefore it is possible to obtain a high contrast ratio even in the case where the degree of polarization of the selective reflection layer 14 itself is low. Moreover, in the liquid crystal display device 300, the light exiting the light source 2 travels through the polarizing plate 46 only once before entering the liquid crystal layer 30. Therefore, the decrease in luminance can be suppressed as compared to the liquid crystal display device 200 shown in FIG. 7.

Note that, in the liquid crystal display device 300 shown in FIG. 8, the light exiting the light source 2 travels through the polarizing plate 46 before entering the rear substrate 10, and therefore enters the rear substrate 10 in the form of linearly polarized light. Therefore, even if the selective reflection layer 14 of the liquid crystal display device 300 were replaced with a mere light-reflecting structure, i.e., a structure which will reflect light toward the liquid crystal layer at a predetermined angle regardless of its polarization direction (e.g., a micro prism array), the liquid crystal display device would still be possible to perform display. However, the linearly polarized light entering the rear substrate would be slightly depolarized while propagating through the rear substrate. Therefore, in such an alternative constitution, the depolarized component would also be reflected toward the liquid crystal layer by the light-reflecting structure, thus causing a decrease in the contrast ratio. On the other hand, the liquid crystal display device 300 includes the selective reflection layer 14, and therefore is able to suppress the decrease in contrast ratio associated with any depolarization occurring during the propagation of linearly polarized light through the rear substrate 10. According to a study of the inventors, with the constitution of the liquid crystal display device 300, it is possible to achieve a contrast ratio which is about six times as large as that obtained with a constitution in which the selective reflection layer 14 of the liquid crystal display device 300 is replaced with a mere light-reflecting structure.

Figure 9:
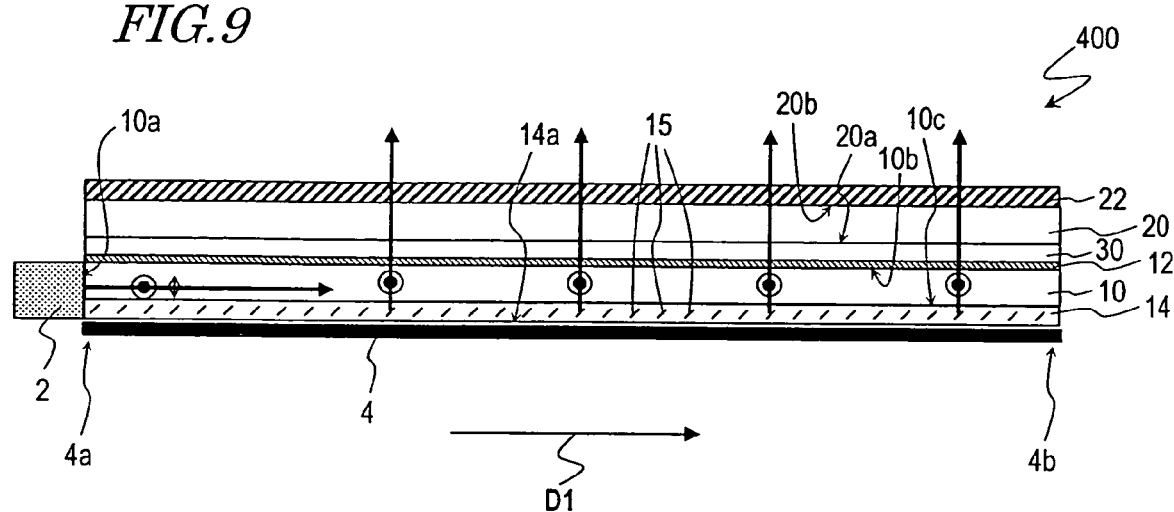
FIG. 9 is a cross-sectional view schematically showing a liquid crystal display device 400 according to a preferable embodiment of the present invention.

FIG. 9 shows another liquid crystal display device 400 according to the present embodiment. The liquid crystal display device 400 differs from the liquid crystal display device 100 shown in FIG. 1 in that a light absorbing plate 4 is provided on the opposite side of the selective reflection layer 14 from the viewer.

The light absorbing plate 4 is formed of a material having a light absorbing ability, and absorbs light which leaks from the selective reflection layer 14 (i.e., light which goes out from the rear face of the selective reflection layer 14). The light absorbing plate 4 is formed in such a manner that its optical absorbance increases in a direction D1 from an end 4a closer to the light source 2 toward an end 4b opposite from the light source 2.

Since the liquid crystal display device 400 includes the light absorbing plate 4 whose optical absorbance increases in the direction D1, it is possible to improve the contrast ratio as well as contrast ratio uniformity across the display surface, thus enabling high-quality display (as will be described below). Problems which may occur in the case where the light absorbing plate 4 is not provided are described below with reference to FIG. 10.

Figure 10:
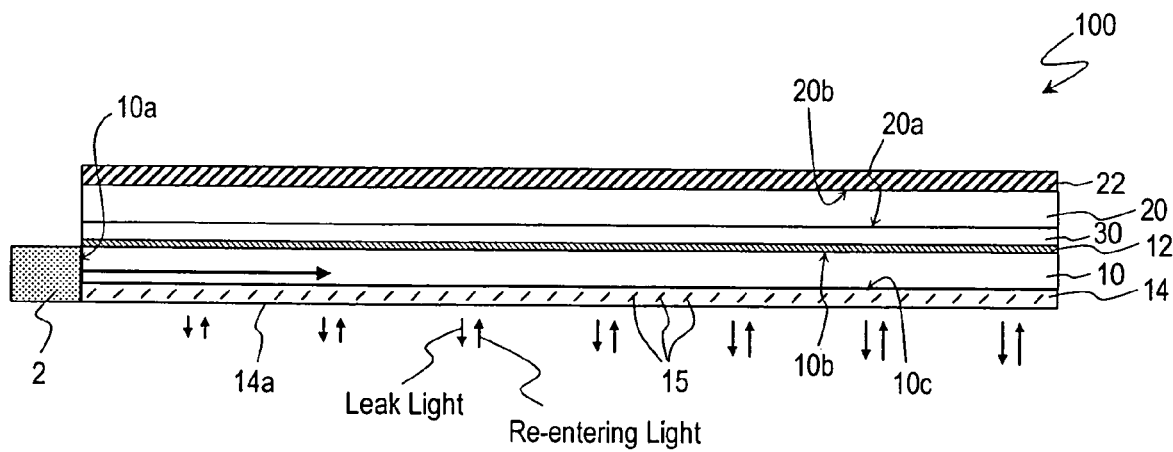
FIG. 10 is a diagram for explaining a problem occurring in the case where no light absorbing plate is provided.

When light propagates through the rear substrate 10 and the selective reflection layer 14, any light that enters the opposite side of the selective reflection layer 14 from the viewer at an angle which does not satisfy the total reflection condition may leak from the selective reflection layer 14. The light leaking from the selective reflection layer 14 is reflected by an object which is present at the rear face side of the liquid crystal display panel (e.g., a case accommodating the liquid crystal display panel and the like), and again enters into the selective reflection layer 14. This re-entering light goes out from the rear substrate 10 toward the viewer side, thus lowering the contrast ratio. FIG. 10 schematically shows the light amounts of leak light from the selective reflection layer 14 and the re-entering light, on the basis of arrow lengths. As shown in FIG. 10, the light amounts of the leak light and the re-entering light increase as the light-guiding distance increases, i.e., as the distance from the light source 2 increases. Therefore, the display contrast ratio becomes lower in regions of the display surface which are farther away from the light source 2. Thus, the contrast ratio fluctuates within the display surface, thus degrading the display quality.

On the other hand, the liquid crystal display device 400 shown in FIG. 9 includes the light absorbing plate 4 for absorbing the leak light from the selective reflection layer 14, and therefore is able to reduce the amount of light re-entering the selective reflection layer 14, thus improving the contrast ratio. Furthermore, since the light absorbing plate 4 is formed in such a manner that its optical absorbance increases in the direction D1 from the end 4a closer to the light source 2 toward the end 4b opposite from the light source 2, fluctuations in the contrast ratio that are associated with the leak light increasing with the light-guiding distance are suppressed, whereby the contrast ratio uniformity across the display surface can be improved. As a result, a high-quality display is realized.

As the light absorbing plate 4, any plate-like member which is formed from a material having a light absorbing ability can be broadly used. The light absorbing plate 4 in the present embodiment is a sheet of black resin material (e.g., PET in which a black pigment is dispersed). It will be appreciated that the light absorbing plate is not limited thereto, but may also be a Poron sheet or the like.

Figure 11:
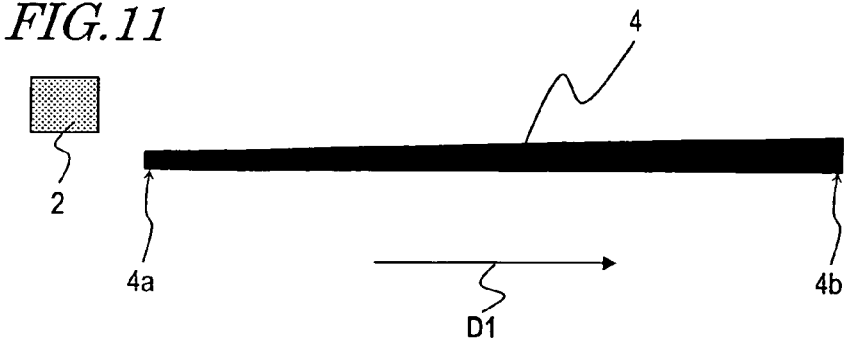
FIG. 11 is a cross-sectional view schematically showing an example of a light absorbing plate comprised in the liquid crystal display device 400.

For example, as shown in FIG. 11, the light absorbing plate 4 may be formed so as to have an increasing thickness in the direction D1, so that its optical absorbance increases in the direction D1.

Figure 12:
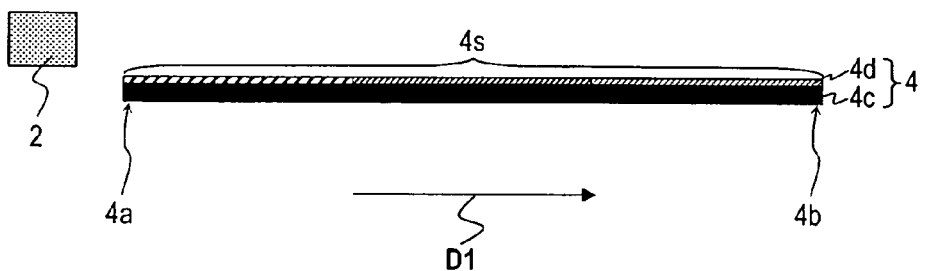
FIG. 12 is a cross-sectional view schematically showing another example of a light absorbing plate comprised in the liquid crystal display device 400.

Alternatively, as shown in FIG. 12, the light absorbing plate 4 may be formed in such a manner that its surface 4s opposing the selective reflection layer 14 has a light diffusing ability, such that the light diffusing ability of the surface 4s lowers in the direction D1. With this constitution, too, the optical absorbance can be increased in the direction D1. In the exemplary constitution shown in FIG. 12, a light diffusing layer 4d is formed on a base 4c, thus conferring a light diffusing ability to the surface 4s of the selective reflection layer 14. As the base 4c, a sheet of black resin material may be used, for example. The light diffusing layer 4d includes a plurality of regions having different light diffusing abilities, such that regions which are farther away from the light source 2 have lower light diffusing abilities (i.e., lower backscattering abilities for light from the selective reflection layer 14). In FIG. 12, regions of different light diffusing abilities are indicated with different hatchings. The light diffusing layer 4d can be formed by, for example, subjecting an upper layer of a base formed from a black resin material to a blast treatment (a surface-roughening treatment in which a minute particulate abrasive is blown against the surface). The light diffusing ability of the light diffusing layer 4d can be evaluated in terms of haze values.

In the exemplary constitution shown in FIG. 11, the light absorbing plate 4 becomes gradually thicker in the direction D1, so that the optical absorbance of the light absorbing plate 4 gradually increases in the direction D1. On the other hand, in the exemplary constitution shown in FIG. 12, the light diffusing ability of the surface 4s of the light absorbing plate 4 decreases in a stepwise manner in the direction D1, so that the optical absorbance of the light absorbing plate 4 increases in a stepwise manner in the direction D1. Although the contrast ratio uniformity across the display surface can be sufficiently improved with the constitution which realizes stepwise increases in the optical absorbance in the direction D1, the constitution in which the optical absorbance of the light absorbing plate 4 gradually increases in the direction D1 can provide a further improved contrast ratio uniformity.

It will be appreciated that the constitution of the light absorbing plate 4 is not limited to those shown in FIGS. 11 and 12. For example, the thickness of the light absorbing plate 4 may have stepwise increases in the direction D1, or the light diffusing ability of the surface 4s of the light absorbing plate 4 may be gradually lowered in the direction D1. Further alternatively, the thickness of the light absorbing plate 4 and the light scattering ability of the surface 4s of the light absorbing plate 4 may both be varied in the direction D1.

From the standpoint of obtaining an even higher contrast ratio, a further polarizing plate may be provided together with the light absorbing plate 4, similarly to the liquid crystal display device 300 shown in FIG. 8.

Figure 13:
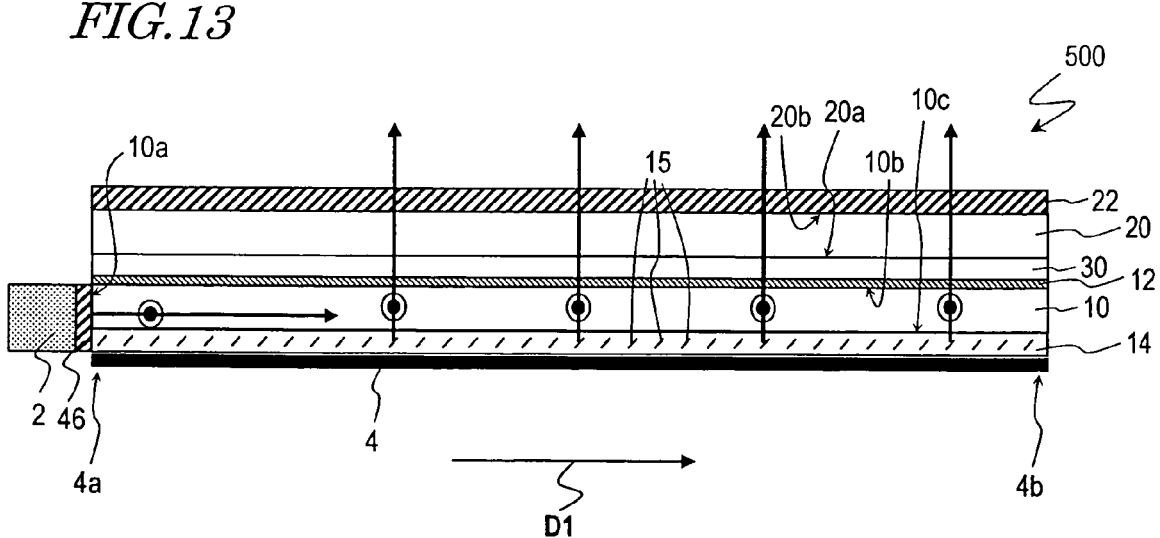
FIG. 13 is a cross-sectional view schematically showing a liquid crystal display device 500 according to a preferable embodiment of the present invention.

FIG. 13 shows a liquid crystal display device 500 which comprises a further polarizing plate in addition to the light absorbing plate 4. The liquid crystal display device 500 differs from the liquid crystal display device 400 shown in FIG. 9 in that a polarizing plate 46 is provided between the light source 2 and a side face of the rear substrate 10. The polarizing plate 46 has a transmission axis which is substantially parallel to the polarization direction of light which has been reflected by the selective reflection layer 14.

In the liquid crystal display device 400, light exiting the light source 2 travels through the polarizing plate 46 before entering the rear substrate 10, and therefore it is possible to obtain a high contrast ratio even in the case where the degree of polarization of the selective reflection layer 14 itself is low. Moreover, since the polarizing plate 46 is provided between the light source 2 and a side face 10a of the rear substrate 10, the addition of the polarizing plate 46 introduces no increase in the thickness of the display device.

Hereinafter, results of contrast ratio measurements for the liquid crystal display device 500 shown in FIG. 13 will be described, where light absorbing plates 4 of various constitutions were produced and used. Note that the following results are all directed to the case where the light-guiding distance in the rear substrate 10 is 4 cm. In the following Tables 1 to 5, the contrast ratio at the end of the display surface closer to the light source 2 is defined as 100%.

Table 1 illustrates a case where a light absorbing plate 4 formed from a black PET had thicknesses of: 25 μm at the end closer to the light source 2; 50 μm in the central portion; and 100 μm at the opposite end from the light source 2 (Example 1). In this case, a contrast ratio of 99% was obtained in the central portion of the display surface, whereas a contrast ratio of 98% was obtained at the opposite end of the display surface from the light source 2, thus indicating that the contrast ratio uniformity across the display surface was sufficiently enhanced.

TABLE 1

Example 1

|  | end closer to light source | central portion | opposite end from light source |
|---|---|---|---|
| thickness of light absorbing plate | 25 μm | 50 μm | 100 μm |
| contrast ratio | 100% | 99% | 98% |

Table 2 illustrates a case where a light absorbing plate 4 formed from a black PET had thicknesses of: 50 μm at the end closer to the light source 2; 75 μm in the central portion; and 100 μm at the opposite end from the light source 2 (Example 2). In this case, a contrast ratio of 97% was obtained in the central portion of the display surface, whereas a contrast ratio of 95% was obtained at the opposite end of the display surface from the light source 2, thus indicating that the contrast ratio uniformity across the display surface was sufficiently enhanced.

TABLE 2

Example 2

|  | end closer to light source | central portion | opposite end from light source |
|---|---|---|---|
| thickness of light absorbing plate | 50 μm | 75 μm | 100 μm |
| contrast ratio | 100% | 97% | 95% |

On the other hand, Table 3 illustrates a case where a light absorbing plate formed from a black PET had a constant thickness of 25 μm at the end closer to the light source, in the central portion, and at the opposite end from the light source (Comparative Example 1). In this case, a contrast ratio of 95% was obtained in the central portion of the display surface, whereas a contrast ratio of 90% was obtained at the opposite end of the display surface from the light source, thus failing to sufficiently enhance the contrast ratio uniformity across the display surface. Furthermore, other light absorbing plates, each having a constant thickness of 50 μm, 75 μm, or 100 μm, were produced similarly to Comparative Example 1 and evaluated. These light absorbing plates also showed poor contrast ratio uniformity.

TABLE 3

Comparative Example 1

|  | end closer to light source | central portion | opposite end from light source |
|---|---|---|---|
| thickness of light absorbing plate | 25 μm | 25 μm | 25 μm |
| contrast ratio | 100% | 95% | 90% |

Table 4 illustrates a case where a base 4c formed from a black PET had a constant thickness of 100 μm, and a light diffusing layer 4d formed by subjecting the surface of the base 4c to a blast treatment had haze values of: 10% at the end closer to the light source 2; 5% in the central portion; and 0% at the opposite end from the light source 2 (Example 3). In this case, a contrast ratio of 99% was obtained in the central portion of the display surface, whereas a contrast ratio of 98% was obtained at the opposite end of the display surface from the light source 2, thus indicating that the contrast ratio uniformity across the display surface was sufficiently enhanced.

TABLE 4

Example 3

|  | end closer to light source | central portion | opposite end from light source |
|---|---|---|---|
| thickness of base | 100 μm | 100 μm | 100 μm |
| haze value of light diffusing layer | 10% | 5% | 0% |
| contrast ratio | 100% | 99% | 98% |

On the other hand, Table 5 illustrates a case where a base formed from a black PET had a constant thickness of 100 μm, and a light diffusing layer formed by subjecting the surface of the base to a blast treatment had a constant haze value of 10% at the end closer to the light source, in the central portion, and at the opposite end from the light source (Comparative Example 2). In this case, a contrast ratio of 90% was obtained in the central portion of the display surface, whereas a contrast ratio of 82% was obtained at the opposite end of the display surface from the light source, thus failing to sufficiently enhance the contrast ratio uniformity across the display surface.

TABLE 5

Comparative Example 2

|  | end closer to light source | central portion | opposite end from light source |
|---|---|---|---|
| thickness of base | 100 μm | 100 μm | 100 μm |
| haze value of light diffusing layer | 10% | 10% | 10% |
| contrast ratio | 100% | 90% | 82% |

Next, taking the liquid crystal display devices 200, 300, and 500 as examples, specific structures for affixing the linear source of light 2 and the liquid crystal display panel will be described. In the figures referred to below, some of the constituent elements of the liquid crystal display devices 200, 300, and 500 are omitted from illustration.

Figure 14:
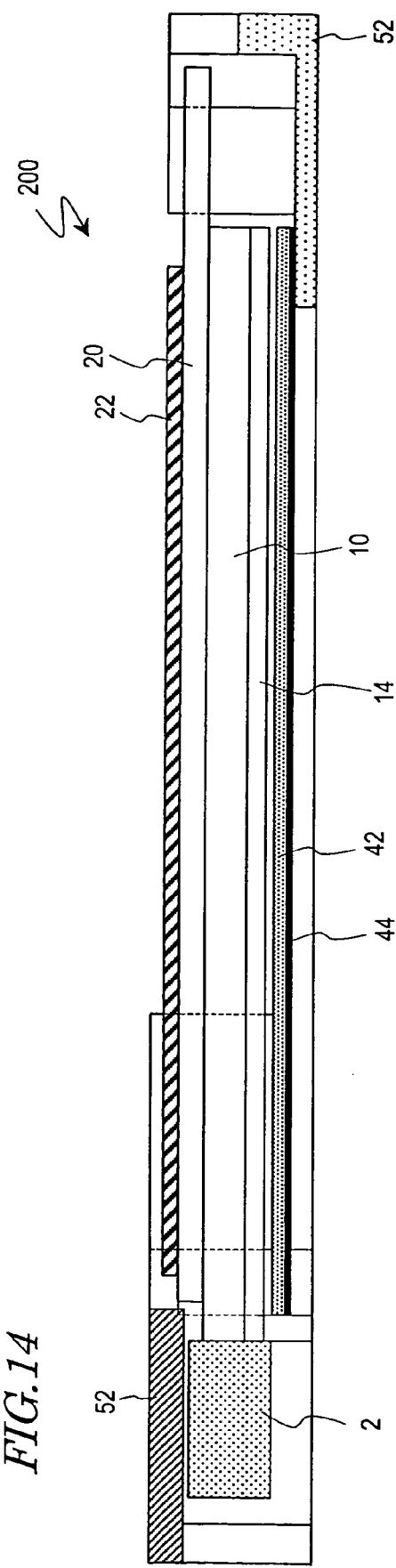
FIG. 14 is a cross-sectional view schematically showing the liquid crystal display device 200.
Figure 15:
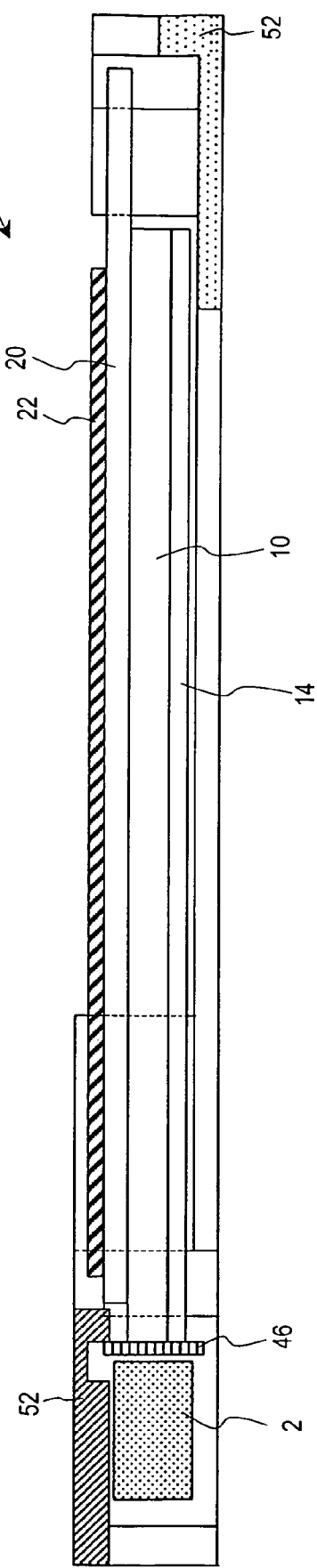
FIG. 15 is a cross-sectional view schematically showing the liquid crystal display device 300.
Figure 16:
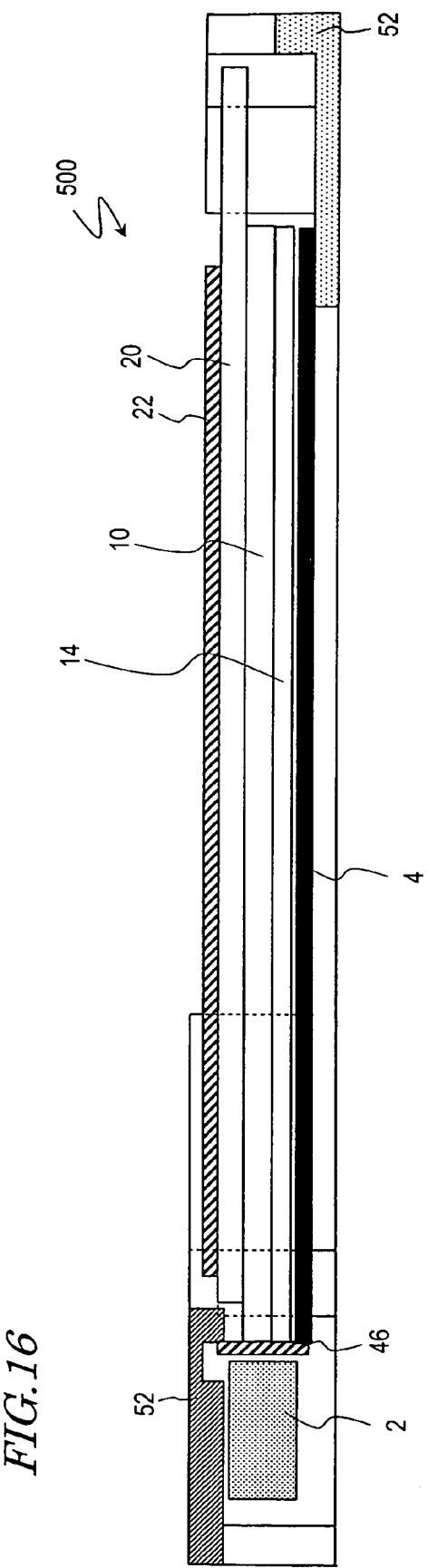
FIG. 16 is a cross-sectional view schematically showing the liquid crystal display device 500.

First, as shown in FIGS. 14, 15, and 16, a retention member (e.g., a holder made of polycarbonate) 52 may be used to affix the linear source of light 2 and the liquid crystal display panel (and further the polarizing plate 46).

Figure 19:
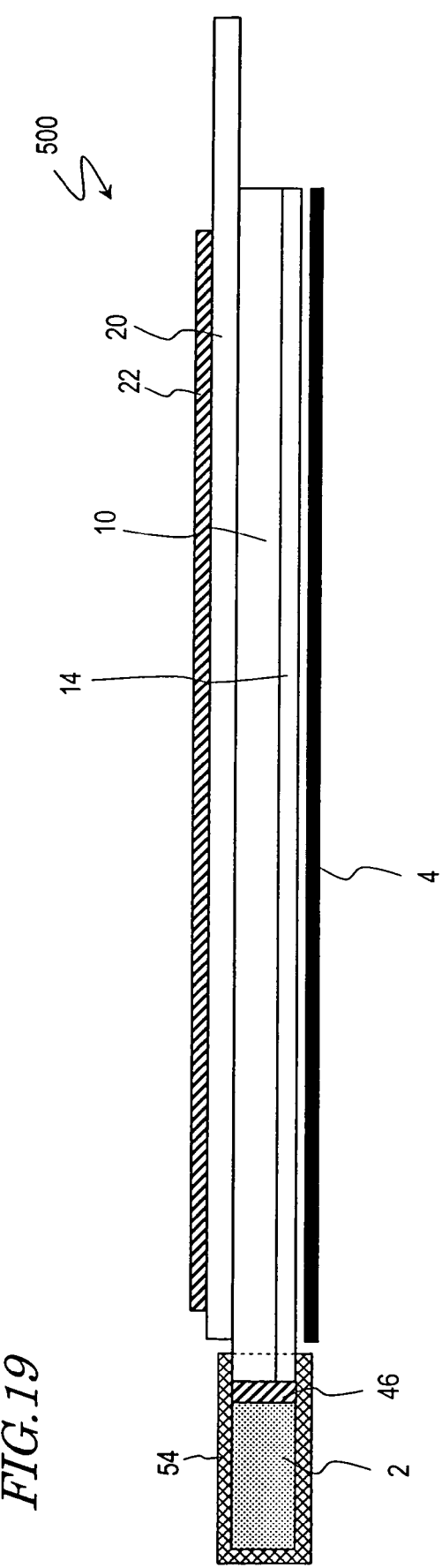
FIG. 19 is a cross-sectional view schematically showing the liquid crystal display device 500.
Figure 23:
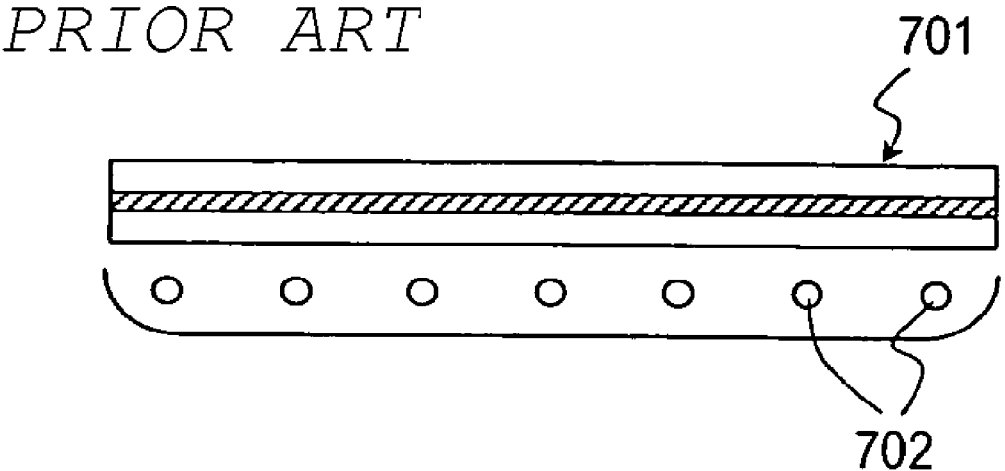
FIG. 23 is a cross-sectional view schematically showing a liquid crystal display device comprising a commonly-used direct type backlight.
Figure 24:
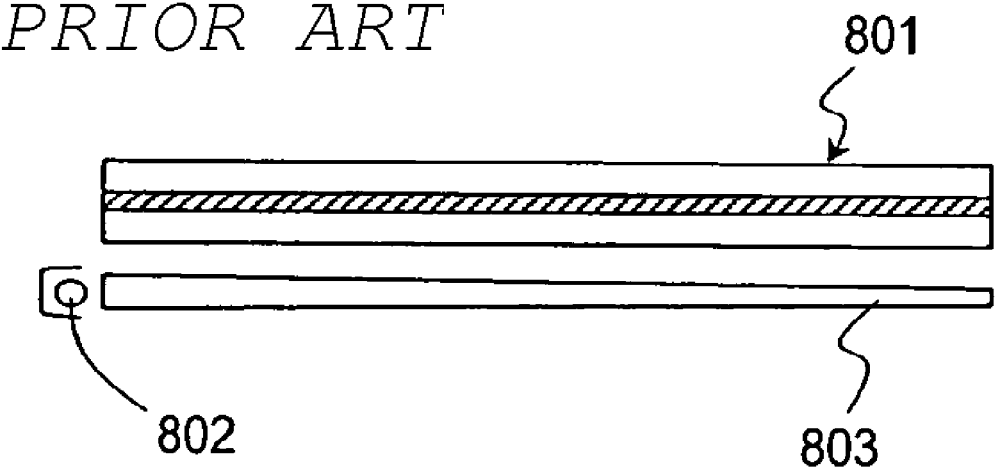
FIG. 24 is a cross-sectional view schematically showing a liquid crystal display device comprising a commonly-used edge light type backlight.

As shown in FIGS. 17, 18, and 19, the linear source of light 2 and the liquid crystal display panel (and further the polarizing plate 46) may be fitted into a bezel 54, thus affixing the linear source of light 2 and the liquid crystal display panel. FIGS. 17, 18, and 19 each illustrate a case where, in order to allow the liquid crystal display panel to be fitted into the bezel 54, the panel is cut in such a manner that the end of the rear substrate 10 closer to the light source 2 protrudes from the end of the front substrate 20 closer to the light source 2 (e.g., by about 1 mm).

Furthermore, from the standpoint of saving space, as shown in FIGS. 20, 21, and 22, the linear source of light 2 may be disposed so as to overlap the front substrate 20. The constitutions shown in FIGS. 20, 21, and 22 are similar to the constitutions shown in FIGS. 17, 18, and 19 in that a bezel 54 is used to affix the linear source of light 2 and the liquid crystal panel, but differ therefrom in that the linear source of light 2 is disposed so as to overlap a portion of the front substrate 20, i.e., a region 20R (referred to as a "non-overlapping region") which does not overlap with the rear substrate 10 when seen from the normal direction of the liquid crystal layer 30.

The non-overlapping region 20R of the front substrate 20 is a region where terminals and the like for connecting the liquid crystal display panel to external circuitry are to be provided. By disposing the linear source of light 2 so as to overlap this non-overlapping region 20R, it becomes possible to enhance space utility. In the case where the linear source of light 2 includes LEDs or the like, such elements may in fact be formed on the non-overlapping region 20R of the front substrate 20.

As has been described above, the liquid crystal display devices according to the present embodiment are easy to be made thin, and can be suitably used for mobile electronic devices such as mobile phones and PDAs.

Although the present embodiment illustrates the present invention by taking transmission-type liquid crystal display devices as examples, the present invention is not limited thereto. The present invention is also suitably used for transmission/reflection combination type liquid crystal display devices.

Although the present embodiment illustrates selective reflection layers 14 which selectively reflect light whose polarization direction is substantially parallel to the principal faces 10b and 10c of the rear substrate 10, the present invention is not limited thereto. A constitution in which light of another polarization direction is selectively reflected may be adopted. The directions of the transmission axes of the polarizing plates 42 and 46 are to be set so as to substantially coincide with the polarization direction of the light reflected by the selective reflection layer 14.

Furthermore, the present embodiment illustrates selective reflection layers 14 that internally include reflection films 15, which may be transparent dielectric films or dielectric multilayer films. However, any layer that is able to selectively reflect light of a specific polarization direction can be broadly used as the selective reflection layer 14. The selective reflection layers 14 illustrated in the present embodiment can be produced through simple production processes, and are able to provide a large difference between the reflectance for P-polarized light and the reflectance for S-polarized light such that the reflectance for S-polarized light is higher.

According to the present invention, there are provided a liquid crystal display device which can be made thinner than conventionally, and a substrate for such a liquid crystal display device.

The liquid crystal display device according to the present invention can be suitably used for various electronic devices, and particularly suitably used for mobile electronic devices such as mobile phones and PDAs.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

This non-provisional application claims priority under 35 USC §119(a) on Patent Applications No. 2004-269825 filed in Japan on Sep. 16, 2004 and No. 2004-277148 filed in Japan on Sep. 24, 2004, the entire contents of which are hereby incorporated by reference.

What is claimed is:

1. A liquid crystal display device comprising:
a first substrate;
a second substrate disposed so as to be closer to a viewer than the first substrate is;
a liquid crystal layer provided between the first substrate and the second substrate;
a light source provided by a side of the first substrate, the light source emitting light toward a side face of the first substrate; and
a selective reflection layer formed on a principal face of the first substrate opposite from the viewer; and
a light absorbing plate provided on an opposite side from the viewer with respect to the selective reflection layer, the light absorbing plate absorbing light leaking from the selective reflection layer; wherein
the selective reflection layer is arranged to selectively reflect light of a specific polarization direction; and
the light absorbing plate is formed in such a manner that an optical absorbance of the light absorbing plate increases in a direction from an end of the light absorbing plate closer to the light source toward an end of the light absorbing plate opposite from the light source.

2. The liquid crystal display device of claim 1, wherein the light absorbing plate is formed in such a manner that the optical absorbance of the light absorbing plate gradually increases in the direction.

3. The liquid crystal display device of claim 1, wherein the light absorbing plate is formed in such a manner that the optical absorbance of the light absorbing plate increases in a stepwise manner in the direction.

4. The liquid crystal display device of claim 1, wherein the light absorbing plate is formed with an increasing thickness, the thickness increasing in the direction.

5. The liquid crystal display device of claim 1, wherein the light absorbing plate has, on a side closer to the selective reflection layer, a surface having a light diffusing ability which becomes lower in the direction.

* * * * *